US011406856B2

(12) United States Patent
Kempf et al.

(10) Patent No.: US 11,406,856 B2
(45) Date of Patent: Aug. 9, 2022

(54) FIRE EXTINGUISHING SYSTEM VALVE

(71) Applicant: Minimax GmbH, Bad Oldesloe (DE)

(72) Inventors: Peter Kempf, Bad Oldesloe (DE); Frank Stachowitz, Ratzeburg (DE)

(73) Assignee: Minimax GmbH, Bad Oldesloe (DE)

( * ) Notice: Subject to any disclaimer, the term of this patent is extended or adjusted under 35 U.S.C. 154(b) by 102 days.

(21) Appl. No.: 16/635,154

(22) PCT Filed: Aug. 1, 2018

(86) PCT No.: PCT/EP2018/070885
§ 371 (c)(1),
(2) Date: Jan. 29, 2020

(87) PCT Pub. No.: WO2019/025496
PCT Pub. Date: Feb. 7, 2019

(65) Prior Publication Data
US 2021/0086007 A1 Mar. 25, 2021

(30) Foreign Application Priority Data
Aug. 1, 2017 (DE) ..................... 10 2017 117 426.5

(51) Int. Cl.
*A62C 35/68* (2006.01)
*A62C 31/28* (2006.01)
(Continued)

(52) U.S. Cl.
CPC .............. *A62C 35/68* (2013.01); *A62C 31/28* (2013.01); *A62C 37/08* (2013.01); *F16K 37/0033* (2013.01); *F16K 37/0041* (2013.01)

(58) Field of Classification Search
CPC ......... A62C 35/68; A62C 31/28; A62C 37/08; F16K 37/0033; F16K 37/0041
(Continued)

(56) References Cited

U.S. PATENT DOCUMENTS 6,246,331 B1   6/2001 McHugh et al.
10,441,833 B2  10/2019 Pohl et al.
(Continued)

FOREIGN PATENT DOCUMENTS

CN   1035735    9/1989
CN   101832419  9/2010
(Continued)

OTHER PUBLICATIONS

International Search Report, International Application No. PCT/EP2018/070885 (published under WO 2019/025496), 5 pages (Dec. 19, 2018).

*Primary Examiner* — Christopher S Kim
(74) *Attorney, Agent, or Firm* — Perkins Coie LLP

(57) ABSTRACT

A fire-extinguishing-system valve (2) having a housing (4), having a fluid-entry chamber (26) provided in the housing (4), having a fluid-exit chamber (24) provided in the housing (4), and having a closing body (28) which can be moved back and forth between a blocking state (32) and a release state (34) and, in the blocking state (32) prevents direct fluid flow between the fluid-entry chamber (26) and the fluid-exit chamber (24) and, in the release position (34), connects the fluid-entry chamber (26) to the fluid-exit chamber (24) directly for fluid-conducting action. The fire-extinguishing-system valve (2) has at least one sensor device (18) for directly monitoring the position of the closing body (28).

14 Claims, 2 Drawing Sheets

(51) Int. Cl.
*A62C 37/08* (2006.01)
*F16K 37/00* (2006.01)

(58) Field of Classification Search
USPC .................................................. 169/19–22
See application file for complete search history.

(56) References Cited

U.S. PATENT DOCUMENTS

| | | | |
|---|---|---|---|
| 10,589,139 B2* | 3/2020 | Ringer | F16K 15/033 |
| 10,596,401 B2* | 3/2020 | Ringer | F16K 17/048 |
| D890,301 S | 7/2020 | Kempf et al. | |
| 10,765,899 B2 | 9/2020 | Pohl et al. | |
| 10,773,113 B2 | 9/2020 | Pohl | |
| 2010/0229975 A1 | 9/2010 | Sweeney et al. | |
| 2011/0048745 A1 | 3/2011 | Karihara | |
| 2012/0103637 A1 | 5/2012 | Karihara | |
| 2016/0001114 A1 | 1/2016 | Hyland et al. | |
| 2018/0043197 A1* | 2/2018 | Ringer | A62C 35/68 |
| 2018/0140881 A1* | 5/2018 | Ringer | F16K 15/033 |
| 2019/0388718 A1 | 12/2019 | Pohl et al. | |
| 2020/0222737 A1 | 7/2020 | Kempf et al. | |
| 2020/0346058 A1 | 11/2020 | Kempf et al. | |
| 2021/0086008 A1 | 3/2021 | Kempf et al. | |

FOREIGN PATENT DOCUMENTS

| | | |
|---|---|---|
| CN | 102802735 | 11/2012 |
| DE | 20 2011 003513 U1 | 8/2012 |
| KR | 2017011846 | 10/2017 |
| WO | WO8600970 | 2/1986 |
| WO | WO 2016/022497 A1 | 2/2016 |

\* cited by examiner

FIRE EXTINGUISHING SYSTEM VALVE

PRIORITY CLAIM AND INCORPORATION BY REFERENCE

This application is a 35 U.S.C. § 371 application of International Application No. PCT/EP2018/070885 filed Aug. 1, 2018, which claims the benefit of German Application No. 10 2017 117 426.5 filed Aug. 1, 2017, each of which is incorporated by reference in its entirety.

TECHNICAL FIELD

The invention relates to a fire-extinguishing-system valve having a housing, having a fluid-entry chamber provided in the housing, having a fluid-exit chamber provided in the housing, and having a closing body which can be moved back and forth between a blocking state and a release state and, in the blocking state prevents direct fluid flow between the fluid-entry chamber and the fluid-exit chamber and, in the release position, connects the fluid-entry chamber to the fluid-exit chamber directly for fluid-conducting action.

BACKGROUND AND SUMMARY OF THE INVENTION

Within the context of the present invention, fire-extinguishing-system valves are understood to mean, in particular, the generic group of passive alarm valves which are designed for use in alarm-valve stations of fire-extinguishing systems, specifically fire-extinguishing systems using water-based extinguishing agents (for example water, water with additives, low-pressure and high-pressure water spray). Known representatives of these types of valve, in the case of fire-extinguishing systems using water-based extinguishing agents, are wet and dry alarm valves and also spray-water valves.

Passive alarm valves are understood to mean valves which open automatically when a predetermined pressure difference between the entry side and exit side is exceeded. Such known passive fire-extinguishing-system valves use a non-return mechanism to separate the pipe network of a sprinkler extinguishing system into a water-channeling pipe network and a sprinkler pipe network. The valves themselves usually have a functionality apt to trigger an alarm in reaction to detection of this opening state. This is realized in the prior art in particular by means of a pressure switch arranged in an external alarm channel (secondary flow). Such a pressure switch then activates, for example, an electrically operated alarm bell or the like.

According to the Standards of the National Fire Protection Association (NFPA), which commits to standardizing fire safety for the United States of America, it is possible, within the sphere of influence of the relevant standards, for a valve like that described above to be replaced by a valve which has a non-return mechanism in conjunction with alarm functionality.

For this purpose, the prior art discloses, in particular, alarm valves in the case of which the alarm functionality is realized via a flow monitor arranged in the valve body. This flow monitor is, in particular, directed to detecting a volume flow through the alarm valve and therefore measures indirectly the extent to which the closing body of the valve is located in a closed state (blocking state) or the extent to which the blocking body is located in a release position, in which case fluid flows through the valve.

However, this indirect flow measurement as a result of the volume flow being measured can have the disadvantage that malfunctioning of the volume flow meter results in an incipient volume flow not being detected and therefore in no alarm being generated. The maintenance of such a flow sensor is also disadvantageous to some extent since, depending on the type of valve, the housing usually has to be removed in its entirety in order for it to be possible for the sensor to be checked and changed over.

The invention was therefore based on the object of providing a fire-extinguishing-system valve which at least partially overcomes the disadvantages which are known in the prior art. In particular, the invention was based on the object of specifying a fire-extinguishing-system valve which provides for simplified maintenance capability and an increased level of reliability as far as generating an alarm is concerned.

The invention achieves the object, in the case of a device of the type outlined in the introduction, in that the fire-extinguishing-system valve has a sensor device for directly monitoring the position of the closing body.

Within the scope of this patent, "directly" is understood to mean that the sensor device monitors the position of the closing body directly, without any other means being required. There are therefore no conclusions drawn as to the position of the closing body with reference to measured variables such as, for example, the pressure in the fluid-entry and/or exit chambers, the throughflow or the like; rather, the position of the closing body is monitored itself (preferably continuously) and directly.

The invention therefore follows the approach of supporting the alarm functioning of the fire-extinguishing-system valve directly on the component which is crucial for throughflow or for preventing the same. The potential source of error stemming from indirect state measurement is therefore avoided.

The sensor device is preferably arranged within the housing, in particular partially or fully in the fluid-entry chamber or the fluid-exit chamber.

In a preferred embodiment, the fire-extinguishing-system valve is developed in that the sensor device is intended to generate an electrical signal when the closing body leaves its blocking position, in particular when the fluid flows through the alarm valve.

In a further preferred embodiment, the sensor device also has a delay device for delaying onward transfer of the electrical signal by a predefined delay period, wherein the delay device is intended preferably to transfer the electrical signal onward when the sensor device senses that the closing body has left the blocking position for a predefined minimum period. This ensures that pressure fluctuations in the fire-extinguishing system do not lead directly to alarms, or false alarms, being triggered; rather, an alarm is generated only when the closing body has been open for a defined period without interruption. The delay period can be adapted specifically to a given fire-extinguishing system.

The fire-extinguishing-system valve preferably has an aperture for accommodating the sensor device, said aperture releasing an opening to the fluid-entry chamber or the fluid-exit chamber, wherein the sensor device is arranged in the aperture and closes the aperture in a fluid-tight manner. Such an arrangement of the sensor device provides for straightforward maintenance capability, since individual sensors, or the sensor device as a whole, can easily be removed from the housing.

The fire-extinguishing-system valve preferably has at least two sensors for monitoring the position of the closing body in redundant fashion. Since alarm triggering can be considered overall as being highly relevant to safety, such a redundant design enhances the failsafe performance, and increases the alarm-generating reliability, of such a fire-extinguishing-system valve.

It should be noted here that, in environments where safety and security are paramount, it is also the case that the use of three sensors can be advisable. Such use of three sensors has the additional advantage that a defective sensor can easily be detected and isolated. Thus, failure of one of the three sensors would result, for example, in the situation where a defective sensor incorrectly senses a closed closing body, whereas two of the three sensors correctly indicate an open closing body. A comparison of the three measured values, then, makes it possible to isolate the defective sensor. Therefore, this measure can further increase the safety against failure, and also the alarm-generating reliability, of the fire-extinguishing-system valve overall. In addition, or as an alternative, the individual sensor has, or one, more or all of the plurality of sensors have, wire-breakage/short-circuiting monitoring for the detection of a sensor defect.

In a preferred embodiment, the sensor device has at least one magnetic sensor. The magnetic sensor further preferably has one or more Reed contacts. In alternative preferred embodiments, the magnetic sensor is a Hall-effect sensor or a magnetoresistive sensor. It has been found that magnetic sensors, surprisingly, can advantageously be used for monitoring closing states in fire-extinguishing-system valves. In particular the use of a magnetic sensor comprising one or more Reed switches has, contrary to expectations, been found to be particularly advantageous even though the sensor, in particular when integrated in the housing of the fire-extinguishing-system valve, is in permanent contact with extinguishing fluid and is exposed to high pressures ranging up to 32 bar. The Reed switch has proven to be sufficiently robust. A further advantage of the Reed switch is its good reaction behavior even to small movement amplitudes of the closing body as well as its straightforward construction and clear signal structure: depending on the opening or closing state of the Reed switch, the magnetic sensor emits a 0/1 signal, which makes the task of interpreting the state of the closing body a particularly straightforward one.

In a preferred embodiment, the sensor device has at least one inductive sensor for monitoring the position of the closing body, wherein the closing body has a metallic portion which is intended to generate an electric voltage in the inductive sensor when the closing body moves. The use of such an inductive sensor can be advantageous, in particular, when the relevant fluid flowing through the valve is translucent, for example, only to a very small extent, or not at all, in which case it is not possible to use, in particular, optical sensors.

As an alternative, or in addition, the sensor device preferably has at least one optical sensor for monitoring the position of the closing body, wherein the closing body has arranged on it an optical reflector for interacting with the optical sensor, in particular so that an optical signal generated by the optical sensor can be reflected back to the sensor for monitoring the position of the closing body. Optical sensors are understood here to mean all sensors which use light in the visible and invisible range for monitoring the position of the closing body. This also includes, explicitly, the use of coherent light, for example laser light.

The sensor device preferably has at least one capacitive sensor for monitoring the position of the closing body. In an alternative embodiment, the fire-extinguishing-system valve has at least one angle sensor for monitoring the position of the closing body, wherein a corresponding rotary encoder is arranged, in particular, on the pin of the closing body.

Within the context of this patent, arrangement on the pin of the closing body is understood to mean that the rotary encoder can be arranged at any desired position on the closing body in relation to the axis of rotation of the same such that angle measurement of the position of the closing body in relation to a static reference is possible.

In an alternative preferred embodiment, the sensor device has at least two different sensors, selected from the following list: magnetic sensor, inductive sensor, optical sensor, capacitive sensor and angle-of-rotation sensor. Such a combination of different sensors and measuring principles can also increase the measuring accuracy and therefore the alarm-generating accuracy. It is also possible to reduce the risk of false alarms by such a combination of different sensors.

In a preferred embodiment, the fire-extinguishing-system valve has a valve seat which is designed to correspond with the closing body and is arranged in the housing, between the fluid-entry chamber and the fluid-exit chamber. The valve seat preferably has an axis of symmetry and an opening cross section which is circular in a direction perpendicular to the axis of symmetry and defines the fluid through-passage between the fluid-entry chamber and fluid-exit chamber. On account of being designed in a corresponding manner, the closing body likewise has a symmetrical, circular cross section. A particular advantage of the sensor principle according to the invention comes to bear here: it is possible for the preferred types of sensor described above to be used in the fire-extinguishing-system valve without there being any need to provide a modified geometry of the closing body and/or of the valve seat, for example in the form of protrusions and/or recesses. This means that the sensor device does not influence the fluid flow from the fluid-entry chamber into the fluid-exit chamber. According to the present invention, the sensor device is arranged particularly preferably in a contact-free manner relative to the closing body of the fire-extinguishing-system valve.

Up until now, a first aspect of the invention has been described, with reference to a fire-extinguishing-system valve. In a further aspect, however, the invention also relates to a method for monitoring the position of a closing body of a fire-extinguishing-system valve, in particular according to one of the preferred embodiments described above, having a housing, having a fluid-entry chamber provided in the housing, having a fluid-exit chamber provided in the housing, wherein the closing body can be moved back and forth between a blocking state and a release state and, in the blocking state, prevents direct fluid flow between the fluid-entry chamber and the fluid-exit chamber and, in the release position, connects the fluid-entry chamber to the fluid-exit chamber directly for fluid-conducting action.

The invention achieves the object mentioned in the introduction in that the method comprises the following steps:

monitoring the position of the closing body directly by means of a sensor device, generating a representative signal by means of the sensor device as soon as the closing body moves from the blocking state into the release state, and preferably transferring the representative signal onward to an evaluation unit, in particular a fire-alarm and/or extinguishing control panel.

The method particularly preferably comprises the utilization of a magnetic sensor for monitoring purposes, wherein the magnetic sensor particularly preferably has one or more Reed switches.

The invention also relates to the use of a magnetic sensor for monitoring the position of a closing body of a fire-extinguishing-system valve, in particular according to one of the preferred embodiments described above.

The advantages and preferred embodiments of the fire-extinguishing-system valve are, at the same time, advantages and preferred embodiments of the method and of the use.

BRIEF DESCRIPTION OF THE DRAWINGS

The invention will be described in more detail hereinbelow by way of preferred exemplary embodiments and with reference to the accompanying figures, in which.

MODE(S) FOR CARRYING OUT THE INVENTION

Figure 1:
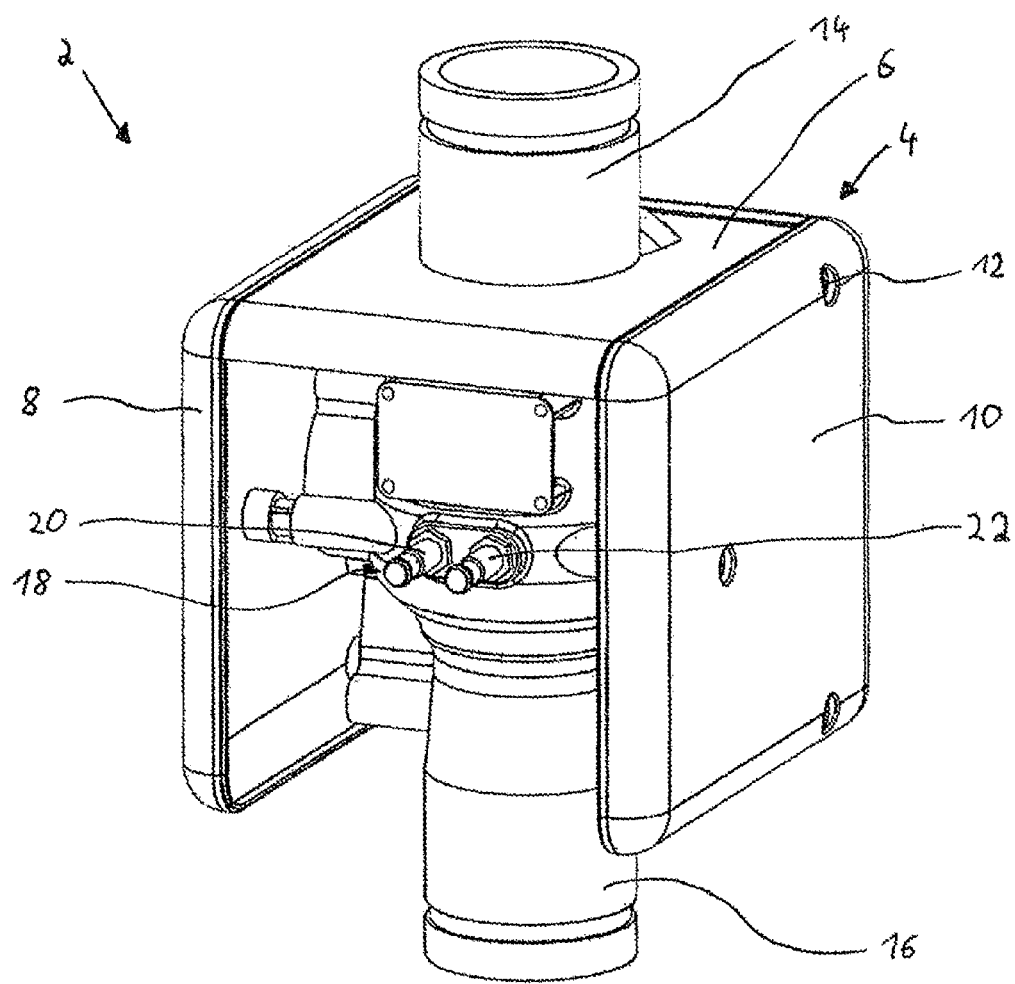
FIG. 1 shows a perspective view of an exemplary embodiment of a fire-extinguishing-system valve according to the invention.

The fire-extinguishing-system valve 2 has a housing 4, which has a main body 6, a first side panel 8 and a second side panel 10. The first side panel 8 and the second side panel 10 are fitted on the main body 6 by means of the screw connections 12. The fire-extinguishing-system valve 2 is attached to the water-channeling and/or fluid-channeling pipe network by means of the fluid inlet 16. Accordingly, fluid enters into the fire-extinguishing-system valve 2 via the fluid inlet 16. Finally, the fluid exits from the fluid-extinguishing-system valve 2, out of the fluid outlet 14, and enters into the pipe network comprising sprinklers or nozzles. In addition, the sensor device 18 is arranged in the main body 6, said sensor device having at least one sensor 20, preferably a magnetic sensor with one or more Reed switches or, as an alternative, one of the sensors of the preferred embodiments described above, and by way of example, in the exemplary embodiment illustrated here, having a first sensor 20 and also a second sensor 22.

Figure 2:
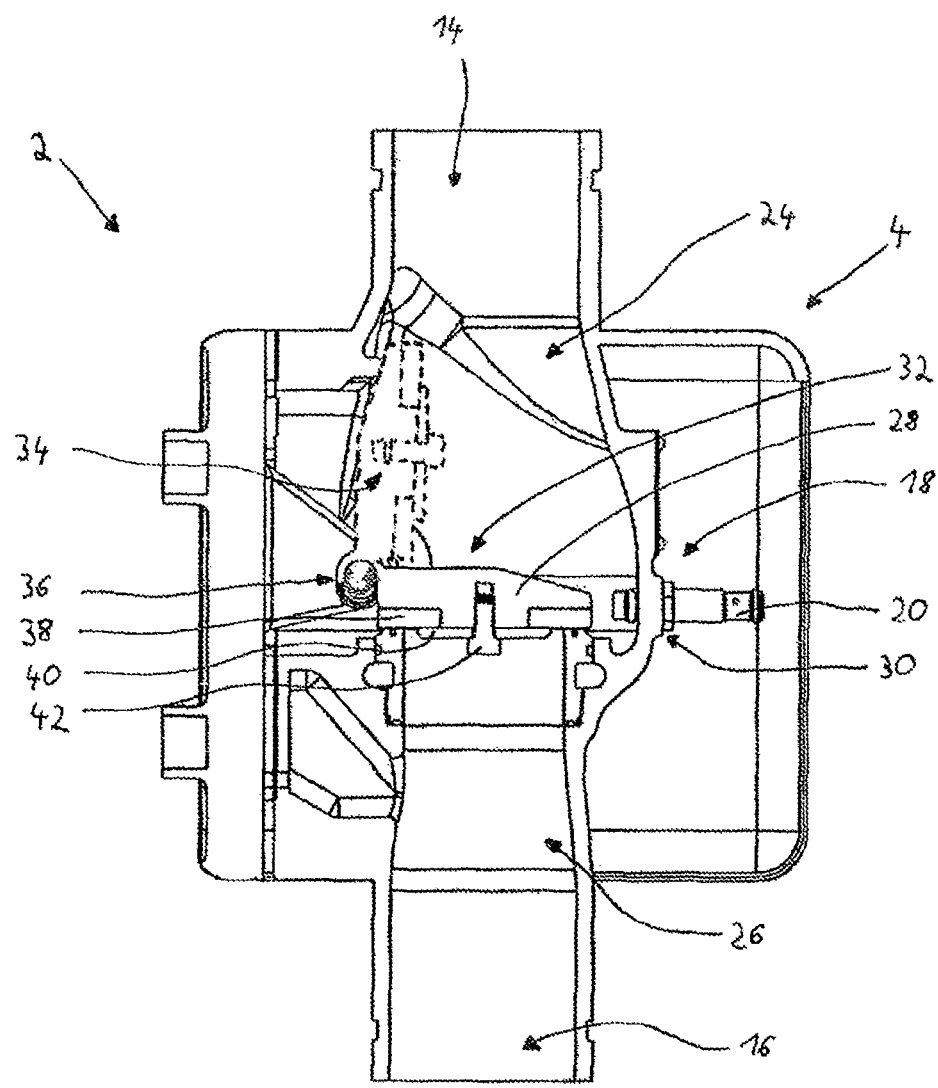
FIG. 2 shows a sectional view of the exemplary embodiment of the fire-extinguishing-system valve according to the invention from FIG. 1.

The functioning and construction of the fire-extinguishing-system valve 2 will be specified in more detail hereinbelow with reference to FIG. 2. In a manner which is already known, fluid passes into a fluid-entry chamber 26 by means of the fluid inlet 16. If there is no fluid flowing through the fire-extinguishing-system valve 2, then the closing body 28 is located in a blocking in position 32. The closing body 28 has a seal 38, which is fastened on the closing body by means of a washer 40 and of a screw connection 42. Finally, the closing body 28 is mounted in a rotatable manner by means of a closing-body pin 36. In this context, FIG. 2 likewise illustrates a fully open state of the closing body 28 (position 34). The sensor device 18 is arranged in the immediate vicinity of the closing body 28. This sensor device 18 is inserted into a recess 30 and connected thereto in a fluid-tight manner. The sectional plane which has been selected in FIG. 2 means that only a first sensor 20 is visible.

The sensor 18 then, monitors the position of the closing body 28. By means of one or more, identical or different, sensors (in the form of magnetic sensors, inductive sensors, optical sensors, capacitive sensors or angle-of-rotation sensors), an alarm is generated whenever the closing body 28 leaves its fully closed blocking position. It should be noted that various sensor-specific encoders (for example an optical reflector, a magnet, a rotary encoder and the like), which are not illustrated separately in FIG. 2, can be arranged, in particular, on the closing body 28.

LIST OF UTILIZED REFERENCE NUMBERS

2 Fire-extinguishing-system valve
4 Housing
6 Main body
8 First side panel
10 Second side panel
12 Screw connection
14 Fluid outlet
16 Fluid inlet
18 Sensor device
20 First sensor
22 Second sensor
24 Fluid-exit chamber
26 Fluid-entry chamber
28 Closing body
30 Recess
32 Closing body in blocking position
34 Closing body in release position
36 Closing-body pin
38 Seal
40 Washer
42 Screw connection

The invention claimed is:

1. A fire-extinguishing-system valve, comprising:
a housing,
a fluid-entry chamber provided in the housing,
a fluid-exit chamber provided in the housing,
a closing body which has a blocking state and a release state, which in the blocking state prevents direct fluid flow between the fluid-entry chamber and the fluid-exit chamber and, in the release state, connects the fluid-entry chamber to the fluid-exit chamber directly for fluid communication, and
at least two sensor devices, each sensor device having a component disposed on the closing body for monitoring the position of the closing body in redundant fashion,
wherein at least one of the at least two sensor devices is configured to generate an electrical signal when the closing body leaves its blocking position, and
wherein the at least one of the at least two sensor devices comprises a delay device for delaying onward transfer of the electrical signal by a predefined delay period.

2. The fire-extinguishing-system valve as claimed in claim 1, wherein the delay device is configured to transfer the electrical signal onward when the at least one of the at least two sensor devices senses that the closing body has left the blocking position for a predefined minimum period.

3. A fire-extinguishing-system valve, comprising:
a housing,
a fluid-entry chamber provided in the housing,
a fluid-exit chamber provided in the housing,
a closing body which has a blocking state and a release state, which in the blocking state prevents direct fluid flow between the fluid-entry chamber and the fluid-exit chamber and, in the release state, connects the fluid-entry chamber to the fluid-exit chamber directly for fluid communication, and at least two sensor devices, each sensor device having a component disposed on the closing body for monitoring the position of the closing body in redundant fashion, wherein the housing comprises a recess for accommodating at least one of the at least two sensor devices, said recess defining an opening to the fluid-entry chamber or the fluid-exit chamber, and the at least one of the at least two sensor devices is arranged in the recess and closes the recess in a fluid-tight manner.

4. The fire-extinguishing-system valve as claimed in claim 3, wherein at least one of the at least two sensor devices comprises at least one magnetic sensor.

5. The fire-extinguishing-system valve as claimed in claim 4, wherein the at least one magnetic sensor comprises one or more reed switches.

6. The fire-extinguishing-system valve as claimed in claim 4, wherein the at least one magnetic sensor comprises a Hall-effect sensor or a magnetoresistive sensor.

7. The fire-extinguishing-system valve as claimed in claim 3, wherein at least one of the at least two sensor devices comprises at least one inductive sensor for monitoring the position of the closing body, and the component on the closing body comprises a metallic portion which is configured to generate an electric voltage in the inductive sensor when the closing body moves.

8. The fire-extinguishing-system valve as claimed in claim 3, wherein at least one of the at least two sensor devices comprises at least one optical sensor for monitoring the position of the closing body, wherein the component on the closing body comprises an optical reflector for interacting with the optical sensor so that an optical signal generated by the optical sensor is reflected back to the sensor for monitoring the position of the closing body.

9. The fire-extinguishing-system valve as claimed in claim 3, wherein at least one of the at least two sensor devices comprises at least one capacitive sensor for monitoring the position of the closing body.

10. The fire-extinguishing-system valve as claimed in claim 3, wherein at least one of the at least two sensor devices comprises at least one angle sensor for monitoring the position of the closing body, and wherein the component on the closing body comprised a corresponding rotary encoder arranged on an axis of the closing body.

11. The fire-extinguishing-system valve as claimed in claim 3, wherein at least one of the at least two sensor devices is arranged partially or fully in the fluid-entry chamber or the fluid-exit chamber.

12. The fire-extinguishing-system valve as claimed in claim 3, wherein at least one of the at least two sensor devices is configured to generate an electrical signal when the closing body leaves its blocking position.

13. The fire-extinguishing-system valve as claimed in claim 3, wherein the at least two sensor devices comprise at least two different sensor devices selected from the following list: magnetic sensor, inductive sensor, optical sensor, capacitive sensor and angle-of-rotation sensor.

14. A method for monitoring a position of a closing body of a fire-extinguishing-system valve, the fire-extinguishing valve including:

a housing, a fluid-entry chamber provided in the housing, a fluid-exit chamber provided in the housing, wherein the position of the closing body has a blocking state and a release state, which in the blocking state prevents direct fluid flow between the fluid-entry chamber and the fluid-exit chamber and, in the release state, connects the fluid-entry chamber to the fluid-exit chamber directly for fluid communication, and at least two sensor devices, each sensor device having a component disposed on the closing body;

wherein the housing comprises a recess for accommodating at least one of the at least two sensor devices, said recess defining an opening to the fluid-entry chamber or the fluid-exit chamber, and the at least one of the at least two sensor devices is arranged in the recess and closes the recess in a fluid-tight manner;

the method comprising:

monitoring the position of the closing body directly by the at least two sensor devices in redundant fashion, generating a representative signal by the at least two sensor devices as soon as the closing body moves from the blocking state into the release state, and transferring the representative signal onward to an evaluation unit including a fire-alarm and/or extinguishing control panel.

* * * * *